United States Patent [19]

van der Heyden et al.

[11] 4,284,618
[45] Aug. 18, 1981

[54] PRODUCTION OF BATTERY-GRADE MANGANESE DIOXIDE

[75] Inventors: André van der Heyden, Olen; Marc Coussement, Hove; Antoine Van Peteghem, Olen, all of Belgium

[73] Assignee: Metallurgie Hoboken-Overpelt, Brussels, Belgium

[21] Appl. No.: 86,713

[22] Filed: Oct. 22, 1979

[30] Foreign Application Priority Data

Nov. 6, 1978 [LU] Luxembourg ............................ 80477

[51] Int. Cl.³ .............................................. C01G 45/02
[52] U.S. Cl. ..................................... 423/605; 423/50; 429/224
[58] Field of Search .................... 423/50, 605; 429/224

[56] References Cited

U.S. PATENT DOCUMENTS

| | | | |
|---|---|---|---|
| 2,473,563 | 6/1949 | Beja | 423/605 |
| 3,414,440 | 12/1968 | Moore | 423/605 |
| 3,770,868 | 11/1973 | Swinkels | 423/605 |
| 4,150,091 | 4/1979 | Peterson | 423/50 |

FOREIGN PATENT DOCUMENTS 597824  3/1944  United Kingdom ..................... 423/605

Primary Examiner—Brian E. Hearn
Attorney, Agent, or Firm—Fred Philpitt

[57] ABSTRACT

Battery-grade $MnO_2$ is produced by
(a) treating a $MnCl_2$ solution with $Cl_2$ and $Mg(OH)_2$ whereby obtaining a $MgCl_2$ solution that contains a $MnO_2$ precipitate; and said $MgCl_2$ solution contains at least 85 g/l of magnesium
(b) allowing to digest the precipitate in the $MgCl_2$ solution in presence of $Cl_2$ under pressure;
(c) separating the digested precipitate from the solution; and
(d) washing and drying the precipitate.

Owing to step (b), operating conditions in step (a) may be such that a concentrated $MgCl_2$ solution is obtained, which is important for the further processing of that solution by pyrohydrolysis.

15 Claims, 1 Drawing Figure

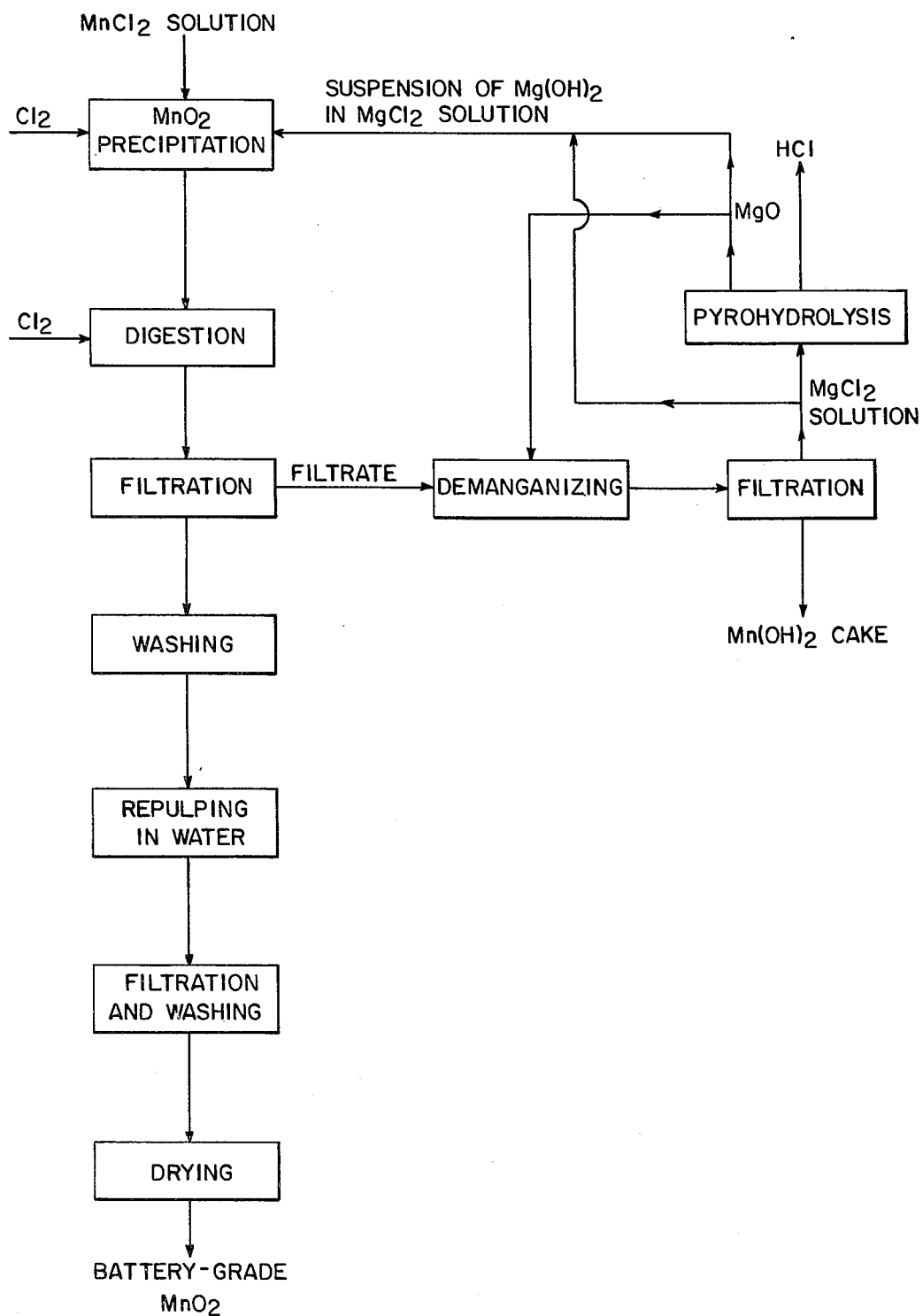

PRODUCTION OF BATTERY-GRADE MANGANESE DIOXIDE

The present invention relates to a process for the production of battery-grade manganese dioxide from a manganese chloride solution, in which said solution is treated with chlorine, while maintaining the pH of the solution between 0.5 and 3 by adding MgO and/or $Mg(OH)_2$, so as to precipitate most of the manganese thereby producing a $MgCl_2$ solution poor in manganese and containing a $MnO_2$ precipitate, the $MnO_2$ precipitate is separated from said $MgCl_2$ solution and the $MnO_2$ precipitate is washed and dried. This process is based upon the following reactions:

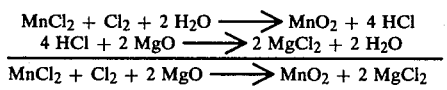

Such process has been described in the U.S. Pat. No. 3,770,868. In this known process, operating conditions are such that said separated $MgCl_2$ solution contains 48 g/l of magnesium as a chloride.

It has been found by the applicants that the above defined process is difficult to realize when it is performed under such conditions that said separated $MgCl_2$ solution contains considerably more magnesium, namely from 85 to 130 g/l of magnesium as a chloride, because it results in a manganese dioxide precipitate with high magnesium content that has to be purified by a excessive washing. However, in such a process it is desirable to produce a concentrated $MgCl_2$ solution, since this solution normally has to be pyrohydrolized to recover MgO and HCl. Pyrohydrolyzing a dilute solution requires evaporation of excessive quantities of water.

The object of the present invention is to provide a process as defined above, which enables one to produce both a concentrated $MgCl_2$ solution and a $MnO_2$ precipitate that does not require a excessive washing.

It has been found that the aforesaid serious drawback can be avoided in a surprisingly simple way by digestion of the $MnO_2$ precipitate in the $MgCl_2$ solution in presence of chlorine under pressure.

The process according to the present invention is thus essentially characterized in that the $MnO_2$ precipitate is digested in the $MgCl_2$ solution in presence of chlorine under pressure.

Digestion is preferably performed under a chlorine pressure of at least 2 kg/cm², or else the digestion time required for obtaining a precipitate of good quality would be excessively long.

Preferably the precipitate is allowed to digest for at least 1 hour, or else the chlorine pressures required would be excessively high to obtain a precipitate of good quality.

In the process of the present invention the $MnO_2$ precipitation itself can be carried out under atmospheric pressure, as is done in the above mentioned process of the prior art; it is however much more advantageous to perform this precipitation in an autoclave under a chlorine pressure of between 1.5 and 4.5 kg/cm², since in the latter case, $MnO_2$ precipitates much faster.

BRIEF DESCRIPTION OF THE DRAWING

Further details and particulars of the process of the invention will appear from the description hereafter of a preferred mode of performing the process of the invention, illustrated in the attached drawing and given as a non-restrictive example.

Solutions with 110 to 130 g/l of Mn as $MnCl_2$ and 25 to 35 g/l of Mg as $MgCl_2$ are treated. Such solutions are e.g. produced after extraction of metals such as Ni, Co, Cu and Fe from liquors resulting from the leaching of manganiferous deepsea nodules, according to the process described in the U.S. Pat. No. 4,026,773.

$MnO_2$ precipitation is performed, under vigorous stirring, in an autoclave under chlorine pressure of between 1.5 and 4.5 kg/cm² and at a temperature of between 50 and 100° C., preferably between 65 and 80° C.

During the precipitation reaction, the pH of the solution is kept between 1 and 2.5 by adding a suspension of magnesium hydroxide in a magnesium chloride solution, the solution used for preparing that suspension containing 90 to 110 g/l of Mg as a chloride and the suspension itself containing 600 to 800 g, preferably 660 to 720 g of $Mg(OH)_2$ per liter of solution.

The aforesaid precipitation reaction is carried on until a residual manganese content of between 10 to 20 g/l is reached in the solution, said content being reached after between 30 to 120 minutes, depending on the chlorine pressure and the pH.

When reaching said residual manganese content, no more magnesium hydroxide is added and the precipitate is allowed to digest in the solution depleted in manganese for a 2 to 4 h period, while maintaining the chlorine pressure in the autoclave between 2.5 and 6 kg/cm².

After digestion in the autoclave, the $MnO_2$ precipitate is separated from the solution depleted in manganese by filtration, the filtration cake is washed, the washed filtration cake is repulped in water, it is filtered again, the filtration cake is washed with water and dried at between 100 and 110° C.

In this way $MnO_2$ is obtained, which contains 100 to 300 ppm (parts per million) of magnesium and which is battery-grade.

MgO and/or $Mg(OH)_2$ is added to the solution depleted in manganese, that contains besides 10 to 20 g/l of manganese, 85 to 100 g/l of magnesium as a chloride, so as to precipitate the residual manganese as an hydroxide and to obtain a practically manganese free $MgCl_2$ solution. The so obtained precipitate is separated from the demanganized $MgCl_2$ solution. Part of this solution is used to prepare the previously mentioned magnesium hydroxide suspension and the other part is subjected to a pyrohydrolysis so as to produce MgO, that is used to prepare the previously mentioned $Mg(OH)_2$ suspension, and HCl.

EXAMPLE 1

This example relates to the production of battery-grade $MnO_2$ according to the above described preferred mode of carrying out the process of the invention.

The starting solution contains in g/l: 114 Mn, 34 Mg, 9 Na, 5 K, 8 Ca.

The operation is performed in an autoclave with stirrer on 25 l solution, at a temperature of 75° C., under a 2 kg/cm² chlorine pressure, the stirrer rotating at a speed of 350 rpm. The pH of the solution is maintained at 2 by adding $Mg(OH)_2$ as a suspension in a $MgCl_2$ solution containing 90 g Mg/l as a chloride (720 g $Mg(OH)_2$ per liter of solution).

After 2 hours, the Mn content of the solution has dropped to 20 g/l while the Mg content of the solution has risen to 91 g/l. No more $Mg(OH)_2$ is added and the reaction mixture is further stirred for 2 hours, while maintaining the chlorine pressure at 4 kg/cm².

After this digestion, the $MnO_2$ precipitate is filtered, the filtration cake is once washed with 50 l of water, the washed cake is repulped in 25 l of water at 70° C. (200 g of cake per liter), it is filtered again and the filtration cake is once washed with 100 l of water. The cake is dried at 105° C.

In this way $MnO_2$ is obtained with the following properties, which proves that this $MnO_2$ is battery-grade:

Chemical analysis:
| | | |
|---|---|---|
| | Mn | 60.5% |
| | $MnO_2$ | > 89% |
| | $H_2O$ | 2% |
| | Cu | ≦ 10 ppm |
| | Ni | ≦ 10 ppm |
| | Co | ≦ 10 ppm |
| | Mg | ≦ 200 ppm |
| | Cl | ≦ 200 ppm |
| | x value in $MnO_x$ | $1.94 \leq x \leq 1.96$ | pH: 5.2
Physical properties:
  specific surface     50 m²/g (BET)
  crystal structure    rho-gamma
  average particle size  4 microns (Coulter counter)
  average pore diameter  15 Å
Electrochemical properties:
(1) Equilibrium potential in a saturated $NH_4Cl$ solution: + 780 mv (Standard Hydrogen Electrode)
(2) Test of a $R_{12}$-paper line type battery made of a mixture of 85% of $MnO_2$ and 15% of acetylene black:
  discharge conditions:  5 minutes/hour during 10 hours/day on a 5 ohm resistance till the potential at the battery terminals drops to 0.9 V
  discharge time:   7 hours It is to be noted that in the same conditions a commerical battery grade $MnO_2$ has given a discharge time of 6.5 hours.

EXAMPLE 2

The same mode of operation as in example 1 is used, but the $MnO_2$ precipitate is not digested under chlorine pressure.

The $MnO_2$ precipitate is thus immediately filtered as soon as no more $Mg(OH)_2$ is added.

The filtration cake is processed in the same way as in example 1 and it is stated that the thus obtained $MnO_2$ contains 2.5 percent in weight of Mg, which is not battery-grade (equilibrium potential of +680 mv (SHE)).

In order to obtain a $MnO_2$ quality that is comparable to the one obtained in example 1, it is necessary, as was found by the applicants, to make following additional operations (after filtration, washing, repulping in water at 70° C., filtration and washing, as performed in example 1): repulping the cake in diluted (20 g/l) sulphuric acid (200 g of cake per liter), filtration, washing with 10 l of a 10 g/l $Na_2CO_3$ solution, and washing with 100 l of water.

EXAMPLE 3

The same mode of operation as in example 1 is used, but $MnO_2$ is precipitated under atmospheric pressure, i.e. by having the chlorine bubbled in the solution.

The $MnO_2$ quality obtained is comparable to that obtained in example 1. $MnO_2$ precipitation lasted however 15 hours while in example 1 this precipitation only lasted 2 hours.

What is claimed is:

1. A process for the production of battery-grade manganese dioxide which comprises:
    (a) contacting a manganese chloride solution with chlorine, while maintaining the pH of the solution between 0.5 and 3 by adding MgO and/or $Mg(OH)_2$ so as to thereby produce a $MgCl_2$ solution poor in manganese and which contains a $MnO_2$ precipitate that is contaminated by magnesium, the operating conditions being such that the produced $MgCl_2$ solution contains at least 85 g./l. of magnesium,
    (b) allowing the $MnO_2$ precipitate to digest in said $MgCl_2$ solution in the presence of chlorine under pressure in an autoclave so as to reduce substantially the magnesium content of said $MnO_2$ precipitate,
    (c) separating the digested $MnO_2$ precipitate from the $MgCl_2$ solution,
    (d) washing and drying the $MnO_2$ precipitate.
2. A process according to claim 1 wherein the chlorine pressure is at least 2 kg/cm² in step (b).
3. A process according to claim 2 wherein the chlorine pressure is between 2.5 and 6 kg/cm².
4. A process according to claim wherein step (b) lasts at least 1 hour.
5. A process according to claim 4 wherein step (b) lasts from 2 to 4 hours.
6. A process according to claim 1 wherein chlorine under pressure is used in step (a).
7. A process according to claim 6 wherein the chlorine pressure is between 1.5 and 4.5 kg/cm² in step (a).
8. A process according to claim 1 wherein chlorine under atmospheric pressure is used in step (a).
9. A process according to claim 1 wherein the solution resulting from step (a) contains 10 to 20 g/l of manganese.
10. A process according to claim 1 wherein the solution resulting from step (a) contains 85 to 100 g/l of magnesium.
11. A process according to claim 1 wherein in step (a) MgO and/or $Mg(OH)_2$ is added as a suspension in a $MgCl_2$ solution.
12. A process according to claim 11 wherein the $MgCl_2$ solution, in which the MgO and/or $Mg(OH)_2$ is put into suspension, contains 90 to 110 g/l of Mg.
13. A process according to claim 11 wherein the suspension contains 360 to 480 g of Mg as MgO or $Mg(OH)_2$ per liter.
14. A process according to claim 11 wherein MgO and/or $Mg(OH)_2$ is added to the solution resulting from step (c) so as to precipitate the manganese as an hydroxide and to produce an almost manganese free $MgCl_2$ solution, the precipitate is separated from the demanganized $MgCl_2$ solution, and at least part of this demanganized $MgCl_2$ solution is subjected to a pyrohydrolysis whereby producing MgO and HCl.
15. A process according to claim 14 wherein part of said demanganized $MgCl_2$ solution and part of said MgO are used to prepare said suspension of MgO and/or $Mg(OH)_2$ in a $MgCl_2$ solution.

* * * * *